March 16, 1926.
J. R. HAYES
CHECK PROTECTOR
Original Filed May 7, 1923
1,576,823
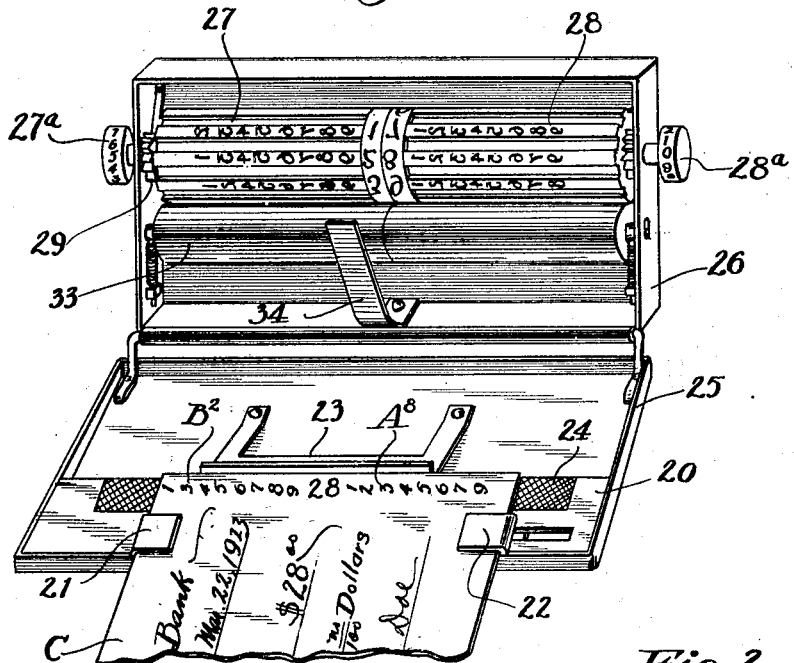
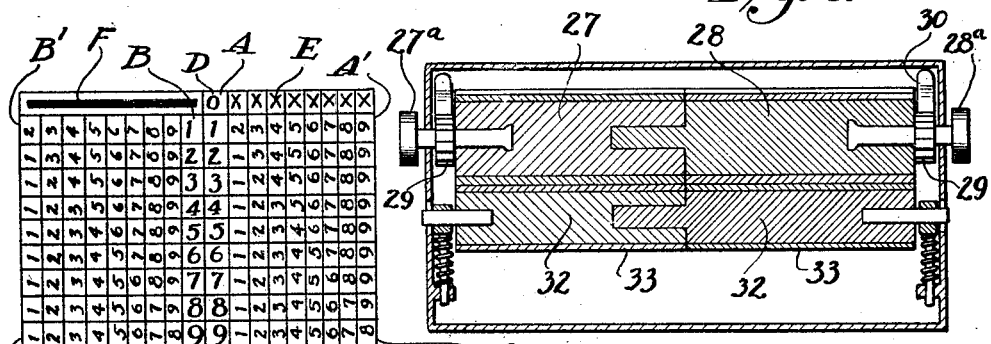
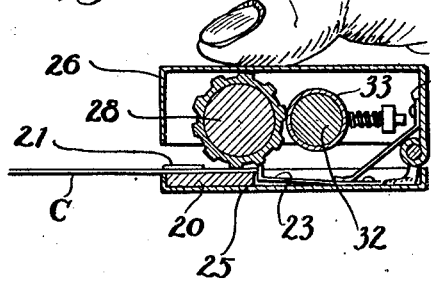
Inventor
J. R. Hayes
by Hazard & Miller
Attys Patented Mar. 16, 1926.

1,576,823

UNITED STATES PATENT OFFICE.

JOHN R. HAYES, OF LOS ANGELES, CALIFORNIA.

CHECK PROTECTOR.

Application filed May 7, 1923, Serial No. 637,222. Renewed January 9, 1926.

*To all whom it may concern:*

Be it known that I, JOHN R. HAYES, a citizen of the United States, residing at Los Angeles, in the county of Los Angeles and State of California, have invented new and useful Improvements in Check Protectors, of which the following is a specification.

This invention relates to pocket check protectors, and has for its object to provide a novel means and system for effectively preventing the surreptitious variation of instruments and documents, such, for instance, as checks, and an object is to provide a device of extreme simplicity and a system whereby there may be readily indicated, upon a written or otherwise completed check, a reliable index as to the maximum amount for which the check or document might have been drawn.

Other objects and advantages will be made manifest in the following specification of an embodiment of the invention illustrated in the accompanying drawings, wherein—

Figure 1 is a perspective of the device in the open relation, and showing a portion of an indexed check thereon.

Fig. 2 is a longitudinal section along the printing cylinders and the inking cylinder.

Fig. 3 is a transverse section, from top to bottom, of the closed device.

Fig. 4 is a plan development of a form of the index system.

The broad object of the present invention is to provide means whereby there may be imprinted upon the face of an instrument or document, such, for instance, as a bank check C, some reliable index showing the maximum amount, or approximately the maximum amount, for which the check is drawn and is payable. In accomplishing this object, I provide means for imprinting upon the face of the check an index numeral, illustrated in Figure 1 as "28", this indicating the approximate maximum for which the check is drawn; it being understood that this number is given only arbitrarily, since the system provides for the selection of numbers ranging between the minimum and maximum amount of a given printing means, which, in the present case, is shown in Figure 4 as capable of printing from "1" to "99", inclusive.

Since it is possible, by forgery and device, to vary an index number which may be applied to the check for protective purposes, my present invention further consists in providing a system of numerals which can be adjusted to print an index numeral, and in association with said index numeral, a check set of characters which it will be impractical to attempt to vary when attempting to or succeeding in varying the primary index number.

More in detail, the improved system includes a number of columns, as A and B, Figure 4, consisting of digits from 1 to 9, inclusive, and one of the columns including a cipher D. These columns are relatively shiftable so that any number between 1 and 99 may be imprinted upon the face of a check C. Extending laterally from the digits of each column A and B is a row of checking digits $A^1$ to $A^9$ inclusive, and $B^1$ to $B^9$ inclusive. These lateral checking rows each include all of the digits excepting the digit in its caption column A or B. Thus, in the protecting row $A^1$ which extends to the right from the index number 1 in column A, there are found the numbers 2, 3, 4, 5, 6, 7, 8 and 9; the numeral 1 heading the inside end of the row $A^1$. The protecting row $A^9$ flanking the character 9 in column A includes all of the digits except 9, and likewise with the remaining rows of numerals to the right of column A.

Similarly, the rows $B^1$ to $B^9$ inclusive, flanking the column B, each include all of the digits excepting the digits found in their caption column B. Therefore, in printing the protective numeral "28" on a check, the columns A and B are relatively moved so as to bring the digits "2" and "8" into opposite position. With such an adjustment of the rows, the respective flanking rows $B^2$ and $A^8$ will be presented in alignment with the protective numeral "28". Therefore, if the aligned index numerals, with their flanking rows of protective numerals be imprinted upon the instrument to be protected, it will be seen that the maximum amount for which the instrument is payable will be clearly displayed and flanked by the protecting rows of numerals which are minus the digits forming the index numerals.

Therefore, if an attempt is made to raise the index numeral, as "28", it will become necessary to insert these numerals in the protecting rows by one device or another, which cannot be readily done without detection.

To print the protective index character "10", the cipher D will be shifted into coordination with the index numeral "1" in the column B, and the protective row flanking the cipher may be formed of any blank indicating type, here shown as cross marks E. To print a protective character "1", a blank bar F to the right of the character "1" in column A is shifted into opposition to this character, so that only the digit "1" will be imprinted, with its protecting row.

Various forms of means may be employed for imprinting the present protective system upon an instrument, and a simple and practicable and at the same time inexpensive and convenient form of printing means is shown in Figures 1, 2 and 3 as including a platen 20, having fixed and relatively adjustable check guide lugs 21 and 22, under which the check C may be thrust over the platen into engagement with a back stop 23, which is shown in the present case as in the form of a depressible finger, for a purpose to be described. The platen 20 may be provided with a roughened surface 24, to be overlapped by the portion of the check which is to be imprinted for increasing the protective value of the system by making it more difficult to change the imprinted protecting numerals.

The platen is here shown as provided in a section 25 of a box having a hingedly mounted top 26, in which there is arranged a pair of co-axial printing cylinders 27 and 28, Figure 2, each of which is independently rotated as by indexed finger knobs 27$^a$ and 28$^a$ extending beyond the ends of the box section 26. To hold the cylinders 28 in selected positions, the stems of the cylinders are provided with ratchet wheels 29, and these are engaged by spring latches 30. The cylinders 27 and 28 are provided with longitudinally extending rows of type characters which are arranged in the system above described, and clearly shown in Figure 4.

Means are provided for supplying the printing faces of the printing cylinders with inking fluid, and such means, in the form shown, includes a cylinder 32, mounted parallel to the printing cylinders and being provided with a pliant inking surface 33, engaging the type faces.

The inking cylinders are adapted to be relatively rotated to bring the desired protective numerals into proper relation, and then the box section 26 is adapted to be folded down so as to bring a printing line of type characters on to the inserted check face, as shown in Figure 3. The back stop finger 23 is shown as yieldable so that it may be depressed for engagement by contiguous printing type.

The box section 26 may be thrown to an open position or partly open position by a spring finger 34.

The characters in the protecting rows flanking the indicating numerals in the columns A and B may be smaller or otherwise differentiated from the indicating numerals, and are preferably arranged in an angular position as to the caption rows A and B; in the present case the protecting numerals in the rows $A^1$—$A^9$, $B^1$—$B^9$, being disposed at right angles to the caption rows. This arrangement is provided to avoid confusion in reading the imprinted protecting index numbers printed to show the approximate maximum amount of the check.

Further embodiments, modifications and variations may be resorted to within the principle of the invention.

What is claimed is:

1. A check protecting device including an indexing system provided with a plurality of columns of digits, which columns are adapted to be shifted to bring selectable numbers into indexing position to indicate, approximately, the maximum value of a check, and rows of characters coordinate to the indexing characters of said columns for indicating the coordinate index value of the row.

2. A check protecting device including an indexing system provided with a plurality of columns of digits, which columns are adapted to be shifted to bring selectable numbers into indexing position to indicate, approximately, the maximum value of a check, and rows of characters coordinate to the indexing characters of said columns for indicating, by omission, the coordinate index value of the row.

3. A check protecting device including an indexing system provided with a plurality of columns of digits representing value denominators, which columns are adapted to be shifted into position indicating approximately the maximum value of the instrument being drawn, and protective key-forming rows of characters for indicating coordinate value-indicating digits of the columns.

4. A check protecting device including an indexing system comprising a plurality of columns of digits and one of which includes a cipher, and which columns are adapted to be relatively shifted to bring selective digits into a value denominating position; the digits of the columns each being provided with a flanking key row of digits forming a protective key against alteration of the denomination digits, said flanking rows each consisting of a series of digits from 1 to 9 inclusive, excepting the digits corresponding to the value denominating digit of the contiguous column.

5. A check protecting device including an indexing system comprising a plurality of columns of digits and one of which includes a cipher, and which columns are adapted to be relatively shifted to bring selective digits into a value denominating position; the digits of the columns each being provided with a flanking key row of digits forming a protective key against alteration of the denomination digits, said flanking rows each consisting of a series of digits from 1 to 9 inclusive, excepting the digits corresponding to the value denominating digit of the contiguous column, the key digits of the rows being differentiated from the value denominating digits of the columns.

6. A check protecting device including an indexing system comprising a plurality of columns of digits and one of which includes a cipher, and which columns are adapted to be relatively shifted to bring selective digits into a value denominating position; the digits of the columns each being provided with a flanking key row of digits forming a protective key against alteration of the denomination digits, said flanking rows each consisting of a series of digits from 1 to 9 inclusive, excepting the digits corresponding to the value denominating digit of the contiguous column, the key digits of the rows being differentiated in size from the value denominating digits of the columns.

7. A check protecting device including an indexing system comprising a plurality of columns of digits and one of which includes a cipher, and which columns are adapted to be relatively shifted to bring selective digits into a value denominating position; the digits of the columns each being provided with a flanking key row of digits forming a protective key against alteration of the denomination digits, said flanking rows each consisting of a series of digits from 1 to 9 inclusive, excepting the digits corresponding to the value denominating digit of the contiguous column, the key digits of the rows being differentiated in angular arrangement from the value denominating digits of the columns.

8. A check protecting device including an indexing system comprising a plurality of columns of digits and one of which includes a cipher, and which columns are adapted to be relatively shifted to bring selective digits into a value denominating position; the digits of the columns each being provided with a flanking key row of digits forming a protective key against alteration of the denomination digits, said flanking rows each consisting of a series of digits from 1 to 9 inclusive, excepting the digit corresponding to the value denominating digit of the contiguous column, the key digits of the rows being differentiated in size and in angular arrangement from the value denominating digits of the columns.

9. A check protecting device including an indexing system comprising a plurality of columns of printable digits and one of which includes a cipher, and which columns are adapted to be relatively shifted to bring selective digits into a value denominating position; the digits of the columns each being provided with a flanking key row of digits forming a protective key against alteration of the denomination digits.

10. A check protecting device including a platen and a plurality of relatively shiftable members having printable digit characters, certain of which are arranged in relatively contiguous shiftable zones so as to be selected and set to print a value denominating index number, and key-forming printable characters flanking the index, printing, denomination digits; the index forming, printable digits and the key forming characters, when set, being adapted to concurrently make an imprint upon an instrument to be protected.

In testimony whereof I have signed my name to this specification.

JNO. R. HAYES.